United States Patent [19]

Sonoda et al.

[11] 4,246,143

[45] Jan. 20, 1981

[54] PROCESS OF PREPARING CONDUCTIVE TIN DIOXIDE POWDER

[75] Inventors: Nobuo Sonoda; Wataru Shimotsuma; Shigeru Tsubusaki, all of Kadoma, Japan

[73] Assignee: Matsushita Electric Industrial Co., Ltd., Osaka, Japan

[21] Appl. No.: 56,807

[22] Filed: Jul. 11, 1979

[30] Foreign Application Priority Data

Jul. 12, 1978 [JP] Japan .................................. 53/85590
Jul. 31, 1978 [JP] Japan .................................. 53/94058
Aug. 28, 1978 [JP] Japan ................................ 53/105273

[51] Int. Cl.$^3$ ........................ H01B 1/08; C01G 19/02
[52] U.S. Cl. ..................................... 252/518; 423/618
[58] Field of Search ........................ 252/518; 423/618

[56] References Cited

U.S. PATENT DOCUMENTS 3,502,597 3/1970 Bush ..................................... 252/518

FOREIGN PATENT DOCUMENTS 51-5300 1/1976 Japan ...................................... 423/618

Primary Examiner—Jack Cooper
Attorney, Agent, or Firm—Lowe, King, Price & Becker

[57] ABSTRACT

A process of preparing a conductive tin dioxide powder doped with 0.001–2.0 mole % of antimony oxide by heating a mixture of stannous oxalate and an antimony compound, preferably a halide, to form tin dioxide through thermal decomposition of stannous oxalate and accomplish firing of the formed tin dioxide without causing sintering. Preferably the mixture is prepared by using a solution of an antimony halide, followed by evaporation of the solvent. This process gives a tin dioxide powder low in specific resistance for the dopant concentration, high in whiteness and small in particle size.

11 Claims, No Drawings

PROCESS OF PREPARING CONDUCTIVE TIN DIOXIDE POWDER

BACKGROUND OF THE INVENTION

The invention relates to a process of preparing a conductive tin dioxide powder doped with antimony.

Recently a conductive tin dioxide (stannic oxide) powder has wide uses in the electric and electronic industries. For example, in certain types of electrographic recording media a conductive tin dioxide powder is employed as a principal material of a conductive coating layer.

A well known method for the preparation of a conductive tin dioxide powder is to fire a mixture of an antimony compound and an ordinary tin dioxide powder marketed as a chemical material thereby to dope a small quantity of antimony into the tin dioxide powder. The specific resistance $\rho$ of a tin dioxide powder obtained by this method becomes lower as the quantity of the doped antimony increases. However, the doping causes also unwanted coloring of the obtained conductive tin dioxide powder, and an increase in the dopant inevitably results in intensification of the coloring and lowering of whiteness of the antimony-doped tin dioxide powder. As another disadvantage, the particle size of a conductive tin dioxide powder obtained by this method depends strongly on the particle size of the tin dioxide powder employed as the starting material, so that the firing process needs to be preceded by pulverization of a commercial tin dioxide powder into very fine particles in order to obtain a conductive tin dioxide powder of a desirably small particle size.

It is known to form a conductive and transparent film of tin dioxide on a surface of a substrate such as of glass by spraying a solution of a tin compound, such as an aqueous solution of tin tetrachloride, containing a small amount of an antimony compound dissolved therein onto a heated substrate. In another known method of forming a conductive and transparent film of tin dioxide, a tin salt of an organic acid such as stannous acetate, stannous oxalate or stannous tartrate is evaporated together with a small quantity of an antimony compound so as to deposit antimony-doped tin dioxide on a surface of a substrate, for example, of glass. However, these methods are not useful for the preparation of a conductive tin dioxide powder.

SUMMARY OF THE INVENTION

It is an object of the present invention to provide a novel process of preparing a conductive tin dioxide powder, which process gives an antimony-doped tin dioxide powder very low in specific resistance relative to the concentration of the doped antimony, very high in whiteness and sufficiently small in particle size.

According to the invention, a conductive tin dioxide powder is prepared by first preparing a mixture of stannous oxalate and an antimony compound and then heating this mixture to form tin dioxide through thermal decomposition of stannous oxalate. The heating temperature is maintained below a level above which occurs sintering of the formed tin dioxide powder. In the preparation of the initial mixture, the proportion of the antimony compound to stannous oxalate is made such that the tin dioxide powder obtained by heating of the mixture is doped with 0.001-2.0 mol% of antimony oxide.

Preferably the antimony compound is selected from antimony halides. Also preferably, the antimony compound is mixed with stannous oxalate by a wet mixing process. For example, powdery stannous oxalate is immersed and stirred in a solution of an antimony halide, followed by evaporation of the solvent.

The heating of the mixture is performed in an oxidizing atmosphere, usually in air, and the heating temperature is maintained within the range from about 400° C. to 1300° C. Preferably an initial stage of the heating until completion of thermal decomposition of stannous oxalate is performed at a relatively low temperature within the range of about 400°-550° C., and thereafter firing is effected by the employment of a higher temperature within the range of about 450°-1300° C., and more preferably in the range of about 700°-1300° C. Most preferably, the heating is accomplished in three stages, that is, an initial decomposition stage performed at about 400°-550° C., an intermediate calcining stage performed at a somewhat higher temperature within the range of about 450°-700° C. and a final firing stage performed at about 700°-1300° C. It is recommended to stir the mixture well during the initial stage of the heating and also the calcined powder before the final firing stage.

Compared with an antimony-doped conductive tin dioxide powder obtained by a typical conventional method, i.e. by firing a mixture of a nonconductive tin dioxide powder and an antimony compound, a tin dioxide powder of the same dopant concentration prepared by a process of the invention is far lower in specific resistance and far better in whiteness. Besides, the particle size of a tin dioxide powder prepared by a process of the invention is sufficiently small though this process does not include any pulverizing step.

Probably a primary reason for such advantages of a process according to the invention is that antimony is doped uniformly in the individual particles of the tin dioxide powder because in this process tin dioxide is formed through decomposition and oxidation of stannous oxalate in the presence of antimony in the reaction system.

DESCRIPTION OF THE PREFERRED EMBODIMENTS

In the present invention, the starting material for tin dioxide is limited to stannous oxalate. In a known method of forming a conductive film of tin dioxide, it is possible to use a tin salt of a different organic acid such as stannous acetate or stannous tartrate as mentioned hereinbefore. However, when stannous oxalate in a process of the invention is replaced by a different tin salt of an organic acid a resultant tin dioxide powder is always very large and irregular in particle size. Presumably the distinctiveness of stannous oxalate is ascribed to a difference in the mechanism of thermal decomposition though a real reason has not yet been clarified.

As mentioned hereinbefore, a conductive tin dioxide powder prepared by a process according to the invention features a low specific resistance and high whiteness. However, this tin dioxide powder is not exceptional in the dependence of its specific resistance and whiteness on the concentration of the doped antimony oxide. As the antimony oxide is increased not only the specific resistance but also the whiteness of the conductive tin dioxide powder lower, and vice versa. Therefore, both the maximum and minimum limits are set to the amount of an antimony compound to be mixed with stannous oxalate in a process of the invention. At the maximum, the amount of the antimony compound is made such that the resultant tin dioxide powder is doped with 2.0 mole% of antimony oxide. In this case, the specific resistance of the conductive tin dioxide powder becomes about 1.3 Ωcm (when measured in a compacted state as will be explained hereinafter) and the whiteness in terms of Hunter index becomes about 41. This whiteness index value is judged to be a minimum permissible limit. On the other hand, the minimum amount of the antimony compound is made such that the resultant tin dioxide powder is doped with 0.001 mole% of antimony oxide. In this case the conductive tin dioxide powder exhibits a specific resistance of about $1.7 \times 10^3$ Ωcm and a Hunter whiteness index of about 81, and a tin dioxide powder having a higher specific resistance is unsuitable to practical applications. Most preferably, an antimony compound is used in such an amount that the conductive tin dioxide powder is doped with 0.1–0.3 mole% of antimony oxide. Under this condition, a process of the invention gives a conductive tin dioxide powder of which specific resistance is below $10^2$ Ωcm and of which whiteness by Hunter index is at least 60.

Preferable heating conditions in a process of the invention are described already. The lower limit of the heating temperature is set at 400° C. since thermal decomposition of stannous oxalate occurs at about 380° C. and, when examined with a thermobalance, is completed before the temperature reaches 400° C. The quality of the product becomes better as the heating temperature at the final firing stage is raised, but the firing temperature should not exceed 1300° C. because tin dioxide powder formed by the heating begins to sinter when heated above 1300° C. Preferably the firing is performed at a temperature above 700° C. because crystallization of tin dioxide powder proceeds very rapidly when the firing temperature exceeds 700° C.

The following examples illustrate a process according to the invention and demonstrate the effects of heating conditons on the important characteristics of the product.

EXAMPLE 1

The antimony compound used in this example was antimony trifluoride $SbF_3$. A solution was prepared by dissolving 0.356 g (0.002 moles) of antimony trifluoride in 50 ml of ethanol, and 103 g (0.5 moles) of powdery stannous oxalate was immersed in this solution at room temperature and mixed well by stirring. Thereafter ethanol was removed from the wet mixture by evaporation.

The resultant mixture of stannous oxalate and antimony trifluoride was put into a ceramic crucible and subjected to heating in an electric furnace at 500° C. for 1 hr to accomplish thermal decomposition of the two components of the mixture. Then the contents of the crucible were fired by raising the temperature in the furnace to 1200° C. and maintaining this temperature for 5 hr.

Through this two-stage heating, the mixture of stannous oxalate and antimony trifluoride turned into a tin dioxide powder doped with 0.2 mole% diantimony pentoxide and colored in very light blue. This powder had a mean particle size of 1.1 μm with a narrow particle size distribution and exhibited a low electrical resistivity and a high index of whiteness as shown in the following Table. The specific resistance $\rho$ of the tin dioxide powder was measured by putting 0.6 g of the powder into an insulating and cylindrical tube having an inner diameter of 6 mm and compressing the sample powder at a pressure of 70 kg/cm$^2$ with cylindrical platinum electrodes fitted into the tube from both sides of the sample powder. The whiteness of the conductive tin dioxide powder was measured with a Hunter colori and gloss meter. For comparison, the same measurements were made on a conventional conductive tin dioxide powder obtained by firing a mixture of a commercially available tin dioxide powder (reagent) and antimony trifluoride powder. This conductive tin dioxide powder contained 0.2 mole% $Sb_2O_5$ as dopant and had a mean particle size of 3.4 μm.

|  | Specific Resistance $\rho$ (Ωcm) | Whiteness (Hunter index) |
| --- | --- | --- |
| Conductive tin dioxide powder of Example 1 prepared from $SnC_2O_4$ | $8.6 \times 10$ | 76 |
| Conductive tin dioxide powder prepared conventionally from $SnO_2$ | $3.6 \times 10^2$ | 63 |

As can be seen in the Table, the tin dioxide powder prepared from stannous oxalate by the method of the invention was remarkably lower in specific resistance and, nevertheless, higher in whiteness index than the conductive tin dioxide powder prepared by the conventional method though the two kinds of tin dioxide powders were doped with the same amount of antimony pentoxide. Furthermore, the tin dioxide powder obtained by the method of the invention was far smaller in particle size.

In this example, the initial heat treatment to decompose the starting materials and the subsequent firing step were performed continuously in an electric furnace. This method is simple and easy to practice but sometimes resulted in that the product was somewhat nonuniform in its resistivity and color probably by reason of certain nonuniformity in the thermal decomposition of the starting materials in the crucible. It was confirmed that this problem can be solved, that is, a conductive tin dioxide powder uniform in resistivity and color can be obtained, merely by stirring the contents of the crucible with a glass rod or the like after completion of the initial heat treatment (at 500° C.) and thereafter performing the firing step (at 1200° C.), though it becomes necessary to once take the crucible out of the furnace between the pyrolysis and firing steps.

EXAMPLE 2

The heating method employed in this example is considered to be most preferable to obviate the aforementioned nonuniformity in the properties of the obtained tin dioxide powder.

The same mixture of stannous oxalate and antimony trifluoride as the one prepared in Example 1 was put into a ceramic crucible. The mixture in the crucible was caused to undergo thermal decomposition by heating the crucible by an open fire of a gas burner for a period of 20 min, and the mixture in the crucible was continuously stirred with a glass rod during the entire period of heating so as to allow every portion of the mixture to contact with atmospheric air. The heating was performed such that the temperature of the contents of the crucible was maintained at about 450° C. However, higher temperatures were recorded locally and temporarily because a portion of the stannous oxalate burned during this heat treatment.

Thereafter the contents of the crucible were fired at 1200° C. for 5 hr to be completely oxidized into a conductive tin dioxide powder doped with 0.2 mole% antimony pentoxide.

The specific resistance $\rho$ of the obtained tin dioxide powder was uniformly $5.3 \times 10$ Ωcm (measured by the method described in Example 1), and the whiteness in terms of Hunter index was uniformly 77. Thus, the pyrolysis of the starting materials by the employment of an open fire to heat the vessel containing the materials with continuous stirring of the heated materials brings about improved conductivity and whiteness of the final product as well as an improved uniformity of the product.

EXAMPLE 3

The mixture of stannous oxalate and antimony trifluoride prepared in accordance with Example 1 was decomposed by the open fire heating method of Example 2. Then the product of the pyrolysis was calcined at 500° C. for 5 hr, followed by well-stirring, and thereafter fired at 1200° C. for 5 hr. Accordingly, this example was the addition of an intermediate calcination step to the two-stage heating method of Example 2. As the effects of the addition of the calcination step, the conductive tin dioxide powder obtained in this example was superior to the one obtained in Example 2 in conductivity, whiteness and uniformity of these characteristics. Numerically, the specific resistance $\rho$ of this tin dioxide powder (measured by the method described in Example 1) was $3.9 \times 10$ Ωcm, and the Hunter index of whiteness was 78.

Throughout Examples 1-3 antimony trifluoride was used as an antimony compound to be mixed with stannous oxalate, but this should not be taken as limitative. Alternatively, an antimony compound in a method of the invention may be selected from other antimony halides, antimony oxides and antimony salts typified by antimony sulfate. However, it is preferable to use an antimony halide, and more particularly an antimony trihalide from a practical viewpoint, because antimony halides readily dissolve in a popular organic solvent such as ethanol and therefore are very convenient to the preparation of a mixture of stannous oxalate and an antimony compound. In other words, it is preferable to prepare a mixture of stannous oxalate and an antimony compound by immersing stannous oxalate which is a powdery substance in a solution of an antimony compound in a readily evaporable organic solvent as exemplified by ethanol and, after sufficient stirring, removing the solvent by evaporation. This mixing method is easy to perform and gives a practically sufficiently uniform mixture. As a supplementary example, Example 1 was repeated except that 0.456 g (0.002 moles) of antimony trichloride $SbCl_3$ was used in place of the antimony trifluoride employed in Example 1. This example, too, gave a conductive tin dioxide powder (mean particle size was 1.1 $\mu$m) doped with 0.2 mole% antimony pentoxide and colored in very light blue. The specific resistance $\rho$ of this tin dioxide powder was $7.4 \times 10$ Ωcm, and the whiteness in terms of Hunter index was 75.

It is permissible to prepare the mixture by mixing stannous oxalate with an antimony compound, which may be a hardly soluble one such as antimony pentoxide, both in solid phase. However, the wet mixing method using a solution of an antimony compound, preferably a halide, is far more desirable than the dry mixing method when consideration is given to the uniformity of the obtained mixtures.

If desired, the above described wet mixing method may be modified by the employment of a solvent which can dissolve not only a selected antimony compound but also stannous oxalate. The next example illustrates such a mixing method as well as the use of an antimony compound other than fluoride.

EXAMPLE 4

A homogeneous solution was prepared by completely dissolving 103 g of stannous oxalate and 0.456 g of antimony trichloride in 500 ml of 1 N hydrochloric acid solution. A mixture of stannous oxalate and antimony trichloride was obtained by completely evaporating water and hydrochloric acid of this solution. This mixture was put into a crucible and subjected to the sequential heat treatments employed in Example 3, that is, the steps of initially heating the crucible by an open fire (with stirring of the contents) to complete thermal decomposition of the mixture in the crucible, then calcining the decomposed mixture, stirring and then finally firing the calcined mixture. Obtained as the result was a conductive tin dioxide powder doped with 0.2 mole% antimony pentoxide. This tin dioxide powder had a mean particle size of about 1 $\mu$m and exhibited a specific resistance $\rho$ (measured by the method described in Example 1) of $2.4 \times 10$ Ωcm and a Hunter index of whiteness of 79.

As an additional feature of a conductive tin dioxide powder prepared by a method according to the invention, the tin dioxide powder exhibits little change in its resistivity even when the powder is ground after completion of the firing step. By way of example, the tin dioxide powder prepared in Example 1 from the mixture of stannous oxalate and antimony trifluoride was elaborately ground in an agata mortar (by turning the pestle hundreds of times), but there occurred only a slight change in the specific resistance of the powder from $8.6 \times 10$ Ωcm (before grinding) to $9.1 \times 10$ Ωcm. Also the tin dioxide powders prepared in Examples 2-4 were tested similarly, and the results were similarly small changes in specific resistance. In comparison, the same grinding of the conductive tin dioxide powder obtained by the conventional method mentioned in Example 1 resulted in a much greater change of the specific resistance: from $3.6 \times 10^2$ Ωcm (before grinding) to $2.4 \times 10^3$ Ωcm. From a practical viewpoint, this feature of a conductive tin dioxide powder is of a great advantage because, in the case of using this powder as a principal material of a conductive coating, the powder is ground in a liquid binder to prepare a conductive paint.

The smallness of a change in the resistivity occurring in the case of grinding a tin dioxide powder obtained by a process according to the invention suggests that in this powder antimony pentoxide serving as the dopant is not merely distributed over the surfaces of the tin dioxide particles but is present also in the interior of the individual tin dioxide particles and that there is only a very small difference in the dopant concentration between the surface and interior of each tin dioxide particle. Probably, such uniform distribution of the dopant in this powder is realized because doping in a process of the invention is accomplished during the process of thermal decomposition of stannous oxalate and formation of tin dioxide in a state well mixed with a source of the dopant. In contrast, in the conventional process where an antimony compound comes into contact with almost crystallized particles of tin dioxide it will be difficult to attain diffusion of the dopant deep into the interior of the individual tin dioxide particles. This presumption gives a convincing explanation for a considerable increase in the specific resistance resulting from grinding of the conventional conductive tin dioxide powder.

Inferior whiteness of the conventional conductive tin dioxide powder is also considered to be ascribed to the presence of most of the dopant on the surfaces of the tin dioxide particles. This reasoning is supported by the fact that whiteness of a powder depends largely on the degree of diffused reflection on the particle surfaces. A conductive tin dioxide powder obtained by a process of the invention and that obtained by the conventional process with the same dopant concentration ought to exhibit the same whiteness when examined by the transmitted light. Actually, however, the tin dioxide powder obtained by the present invention exhibits a higher whiteness by reason of augumented diffused reflection on the particle surfaces where the dopant concentration is lower than that on the particle surfaces of the conventional conductive tin dioxide powder.

What is claimed is:

1. A process of preparing a conductive tin dioxide powder, comprising the steps of:
   (a) preparing a mixture of stannous oxalate and an antimony compound; and
   (b) heating said mixture in an oxidizing atmosphere to form tin dioxide through thermal decomposition of said stannous oxalate by maintaining the heating temperature within the range from about 400° C. to about 550° C. during an initial stage until completion of thermal decomposition of said stannous oxalate and thereafter raising the heating temperature to a temperature within the range from about 700° C. to 1300° C. to accomplish firing of an intermediate mixture obtained by the initial stage heating;
   the proportion of said antimony compound to said stannous oxalate in the step (a) being made such that a tin dioxide powder obtained through the step (b) is doped with 0.001–2.0 mole% of $Sb_2O_5$.

2. A process according to claim 1, wherein said intermediate mixture is stirred before raising of the heating temperature after completion of the initial stage heating.

3. A process according to claim 1, wherein the initial stage heating in the step (b) is performed by placing said mixture prepared in the step (a) in a vessel, heating said vessel by an open fire and simultaneously and continuously stirring said mixture in said vessel.

4. A process of preparing a conductive tin dioxide powder, comprising the steps of:
   (a) preparing a mixture of stannous oxalate and an antimony compound; and
   (b) heating said mixture in an oxidizing atmosphere to form tin dioxide through thermal decomposition of said stannous oxalate by maintaining the heating temperature within the range from about 400° C. to about 550° C. during an initial stage until completion of thermal decomposition of said stannous oxalate, then raising the heating temperature and maintaining the heating temperature within the range from about 450° C. to about 700° C. to calcine an intermediate mixture obtained by the initial stage heating and finally further raising the heating temperature to a temperature within the range from about 700° C. to 1300° C. to accomplish firing of the calcined intermediate;
   the proportion of said antimony compound to said stannous oxalate in the step (a) being made such that a tin dioxide powder obtained through the step (b) is doped with 0.001–2.0 mole % of $Sb_2O_5$.

5. A process according to claim 4, wherein the initial stage heating in the step (b) is performed by placing said mixture prepared in the step (a) in a vessel, heating said vessel by an open fire and simultaneously and continuously stirring said mixture in said vessel.

6. A process according to claim 5, wherein said intermediate mixture is stirred before raising of the heating temperature after completion of the initial stage heating in the step (b).

7. A process according to claims 1, or 4, wherein said antimony compound is an antimony halide.

8. A process according to claim 7, wherein said mixture in the step (a) is prepared by a wet mixing method.

9. A process according to claim 7, wherein said mixture in the step (a) is prepared by immersing stannous oxalate in a solution of said antimony halide in a solvent, stirring said stannous oxalate immersed in said solution and thereafter evaporating said solvent from said solution.

10. A process according to claim 7, wherein said mixture in the step (a) is prepared by dissolving both stannous oxalate and said antimony halide in a solvent and thereafter evaporating said solvent.

11. A process according to claim 1 or 4, wherein the proportion of said antimony compound to said stannous oxalate in the step (a) is made such that a tin dioxide powder obtained through the step (b) is doped with 0.1–0.3 mole % of $Sb_2O_5$.

* * * * *